United States Patent
Kawanoue et al.

(10) Patent No.: US 10,452,048 B2
(45) Date of Patent: Oct. 22, 2019

(54) CONTROL SYSTEM AND CONTROL DEVICE

(71) Applicant: OMRON Corporation, Kyoto-shi, Kyoto (JP)

(72) Inventors: Shinsuke Kawanoue, Kyoto (JP); Hiroshi Kuribayashi, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 129 days.

(21) Appl. No.: 15/706,847

(22) Filed: Sep. 18, 2017

(65) Prior Publication Data

US 2018/0143606 A1    May 24, 2018

(30) Foreign Application Priority Data

Nov. 22, 2016   (JP) ................. 2016-226557

(51) Int. Cl.
  *G05B 19/05*    (2006.01)
  *G05B 19/042*   (2006.01)
  *G06F 9/48*     (2006.01)

(52) U.S. Cl.
  CPC ........... *G05B 19/05* (2013.01); *G05B 19/042* (2013.01); *G06F 9/4887* (2013.01);
  (Continued)

(58) Field of Classification Search
  None
  See application file for complete search history.

(56) References Cited

U.S. PATENT DOCUMENTS 3,772,458 A * 11/1973 May .................. H04B 1/66
                                             375/240.12
2010/0161263 A1   6/2010 Benmouyal et al.
(Continued)

FOREIGN PATENT DOCUMENTS

| EP | 2202595 A1   | 6/2010 |
| JP | 2010-170536 A | 8/2010 |

OTHER PUBLICATIONS

Cervin et al. 'Optimal Online Sampling Period Assignment: Theory and Experiments', IEEE Transactions on Control Systems Technology, vol. 19, No. 4, Jul. 2011.*
(Continued)

*Primary Examiner* — Bernard G Lindsay
(74) *Attorney, Agent, or Firm* — Metrolex IP Law Group, PLLC

(57) ABSTRACT

A control system includes a control device that repeatedly performs a series of pieces of processing including I/O refresh processing and program execution processing. The control system includes: a first obtainment unit that obtains a first sample value group collected by repeatedly performing the I/O refresh processing in a first control period; a second obtainment unit that obtains a second sample value group collected by repeatedly performing the I/O refresh processing in a second control period longer than the first control period; a determination unit that determines whether a first frequency component in the first sample value group and a second frequency component in the second sample value group are substantially identical to each other; and a change unit that changes the first control period to the second control period under a condition that the first frequency component and the second frequency component are substantially identical to each other.

14 Claims, 12 Drawing Sheets

(52) U.S. Cl.
CPC ........... *G05B 2219/1147* (2013.01); *G05B 2219/13086* (2013.01); *G05B 2219/34008* (2013.01)

(56) References Cited

U.S. PATENT DOCUMENTS

| | | | |
|---|---|---|---|
| 2010/0174387 A1 | 7/2010 | Ono et al. | |
| 2012/0078670 A1* | 3/2012 | Yamamura | G05B 19/4184 705/7.11 |
| 2015/0381734 A1* | 12/2015 | Ebihara | G06F 3/06 709/203 |

OTHER PUBLICATIONS

Cervin et al. 'Feedback Scheduling of Control Tasks' Proceedings 39th IEEE Conference on Decision and Control, IEEE (2000).*
The extended European search report (EESR) dated May 8, 2018 in a counterpart European Patent application.

* cited by examiner

FIG. 6

Select variable used in control period optimization processing.
(It is effective to select variable having fastest time change)

| Selection | Unit No. | Channel No. | Variable name | Unit type | Comment |
|---|---|---|---|---|---|
| ☐ | 0 | 0 | Input_A01 | AI | Displacement sensor 1 |
| ☒ | 0 | 1 | Input_A02 | AI | Displacement sensor 2 |
| ☐ | 1 | 0 | Input_D01 | DI | Photoelectric sensor 1 |
| ☐ | 1 | 1 | Input_D02 | DI | Photoelectric sensor 2 |
| ☐ | 1 | 2 | Input_D03 | DI | Photoelectric sensor 3 |
| ☐ | 1 | 3 | Input_D04 | DI | Photoelectric sensor 4 |
| ☐ | 2 | 0 | Input_C01 | Special (counter) | Conveyer position 1 |
| ☐ | 2 | 1 | Input_C02 | Special (counter) | Conveyer position 2 |

OK

CONTROL SYSTEM AND CONTROL DEVICE

CROSS-REFERENCE TO RELATED APPLICATION

This application is based on Japanese Patent Application No. 2016-226557 filed with the Japan Patent Office on Nov. 22, 2016, the entire contents of which are incorporated herein by reference.

FIELD

The present technology relates to a technology of optimizing a control period in a control system including a control device.

BACKGROUND

An FA (Factory Automation) technology in which a control device such as a PLC (Programmable Logic Controller) is used becomes widespread in various production sites. For example, as disclosed in Unexamined Japanese Patent Publication No. 2010-170536, the control device repeatedly performs a series of pieces of processing such as input and output refresh processing, common processing, user program execution processing, and peripheral service processing.

The control device is being made intelligent with recent progress of Information and Communication Technology (ICT). Along with the intelligent control device, the control device performs more pieces of processing (a task or a process). Because of a limited resource of the control device that performs the pieces of processing, it is necessary to efficiently use the resource.

Unexamined Japanese Patent Publication No. 2010-170536 pays attention to equalization of an execution interval of the sequential input and output refresh processing irrespective of factors such as a variation in execution time necessary for a user program, but does not consider the above problem.

SUMMARY

The present technology is aimed at a method for changing a period in which the series of pieces of processing is repeatedly performed in the control device according to a situation.

According to one aspect, there is provided a control system including a control device that repeatedly performs a series of pieces of processing including I/O refresh processing and program execution processing in a first control period. The control system includes: a first obtainment unit configured to obtain a first sample value group that is collected by repeatedly performing the I/O refresh processing in the first control period; a second obtainment unit configured to obtain a second sample value group that is collected when the I/O refresh processing is repeatedly performed in a second control period longer than the first control period; a determination unit configured to determine whether a first frequency component included in the first sample value group and a second frequency component included in the second sample value group are substantially identical to each other; and a change unit configured to change the first control period to the second control period under a condition that the first frequency component and the second frequency component are substantially identical to each other.

The change unit provides a user interface that presents information about a change from the first control period to the second control period.

It may be preferable that the change unit notifies a user whether the first frequency component and the second frequency component are substantially identical to each other.

It may be preferable that the change unit receives user's operation to change the first control period to the second control period.

It may be preferable that the second obtainment unit obtains the second sample value group with respect to each of plural second control periods, and the determination unit decides the longest second control period in the second frequency components substantially identical to the first frequency component by comparing the second frequency components included in the second sample value groups.

It may be preferable that the second control period is set to an integral multiple of the first control period.

It may be preferable that the control system further includes a conversion unit configured to generate a frequency component by performing a fast Fourier transform on the sample value group.

It may be preferable that the control system further includes a monitoring unit configured to determine whether a sample value collected through the I/O refresh processing is properly collected in the second control period while the series of pieces of processing is repeatedly performed in the second control period.

According to another aspect, a control device includes: an execution unit configured to repeatedly perform a series of pieces of processing including I/O refresh processing and program execution processing in a first control period; a first obtainment unit configured to obtain a first sample value group that is collected by repeatedly performing the I/O refresh processing in the first control period; a second obtainment unit configured to obtain a second sample value group that is collected when the I/O refresh processing is repeatedly performed in a second control period longer than the first control period; a determination unit configured to determine whether a first frequency component included in the first sample value group and a second frequency component included in the second sample value group are substantially identical to each other; and a change unit configured to change the first control period to the second control period under a condition that the first frequency component and the second frequency component are substantially identical to each other.

In the control device of the present technology, the period in which the series of pieces of processing is repeatedly performed can be changed according to the situation.

BRIEF DESCRIPTION OF THE DRAWINGS

FIG. 6 is a view illustrating an example of a user interface screen related to step S4 in FIG. 5;

DETAILED DESCRIPTION

Figure 1:
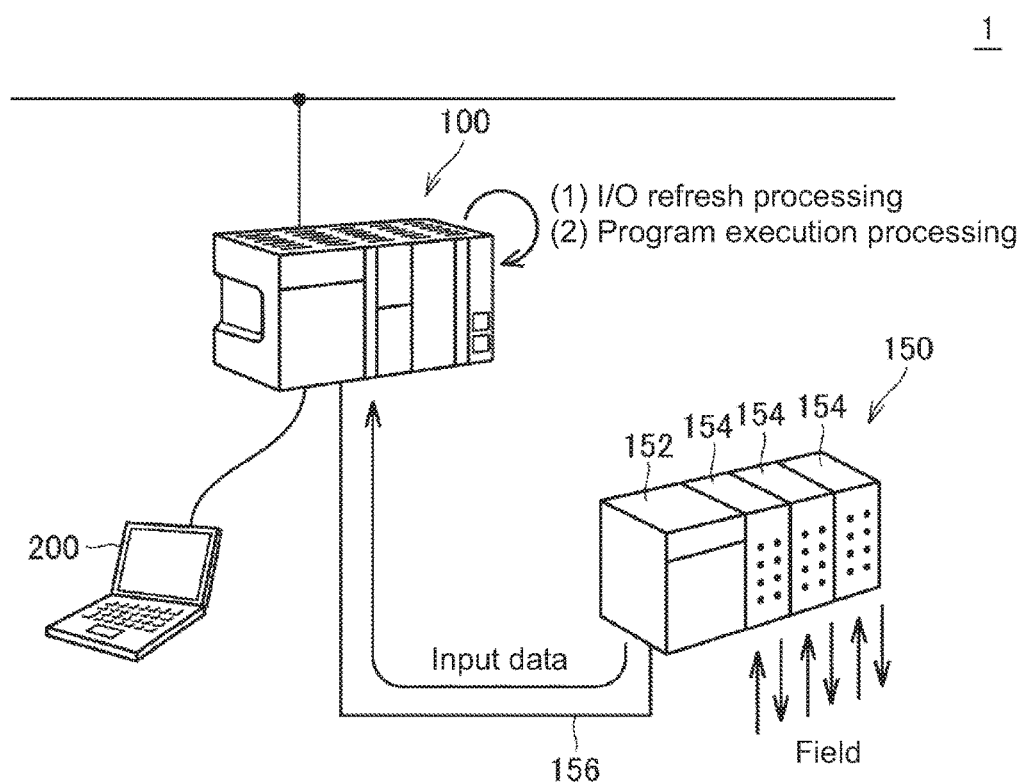
FIG. 1 is a schematic diagram illustrating a configuration example of a control system including a control device according to one or more embodiments.

Hereinafter, one or more embodiments will be described with reference to the drawings. In the drawings, the identical or equivalent component is designated by the identical numeral, and overlapping description is omitted.

<A. Configuration Example of Control System>

A configuration example of a control system 1 including a control device according to one or more embodiments will be described.

FIG. 1 is a schematic diagram illustrating the configuration example of the control system 1 including the control device of one or more embodiments. Referring to FIG. 1, the control system 1 of one or more embodiments includes a control device 100, a remote input and output device (hereinafter, also referred to as a remote I/O (Input/Output) device) 150 connected to the control device 100 through a network 156, and a support device 200 connected to the control device 100. The control device 100 collects input data from a control object or manufacturing equipment and a production line related to control (hereinafter, also generally named a field) through an input and output unit installed in the control device 100 and an input and output unit installed in the remote I/O device 150 (I/O refresh processing).

For example, the remote I/O device 150 includes a connection management unit 152 and one or plural input and output units 154. The connection management unit 152 exchanges data with the control device 100 through the network 156. Specifically, the connection management unit 152 transfers input data obtained by the input and output unit 154 to the control device 100, and transfers output data from the control device 100 to the object input and output unit 154. Typically the input and output unit 154 has at least one of a function of obtaining a signal from the field as the input data and a function of outputting a signal of an instruction to the field based on the output data from the control device 100.

Based on the collected input data, the control device 100 executes a previously-registered user program (including a sequence program performing sequence control, a motion program controlling a position of a robot, processing program performing various pieces of data processing, and the like) to calculate the output data (program execution processing). Finally, based on the calculated output data, the control device 100 outputs a signal to drive the object manufacturing equipment or line (typically, an actuator such as a relay and a servo) (I/O refresh processing).

Basically the control device 100 repeatedly performs a series of pieces of processing including the I/O refresh processing and the program execution processing in a previously-set control period.

Hereinafter, the description is made while attention is mainly paid to input data collection processing from the field. The processing of one or more embodiments can similarly be applied to output of a signal constituting a command based on the output data.

The support device 200 supports preparation necessary for the control device 100 to control the control object. Specifically, the support device 200 provides a development environment (such as a program production editing tool, a parser, and a compiler) of a program executed by the control device 100, a setting environment setting parameters (configurations) of the control device 100 and various devices connected to the control device 100, a function of transmitting a generated user program to the control device 100, and a function of correcting or changing the user program executed by the control device 100 on line.

<B. Hardware Configuration Example of Control Device 100>

Figure 2:
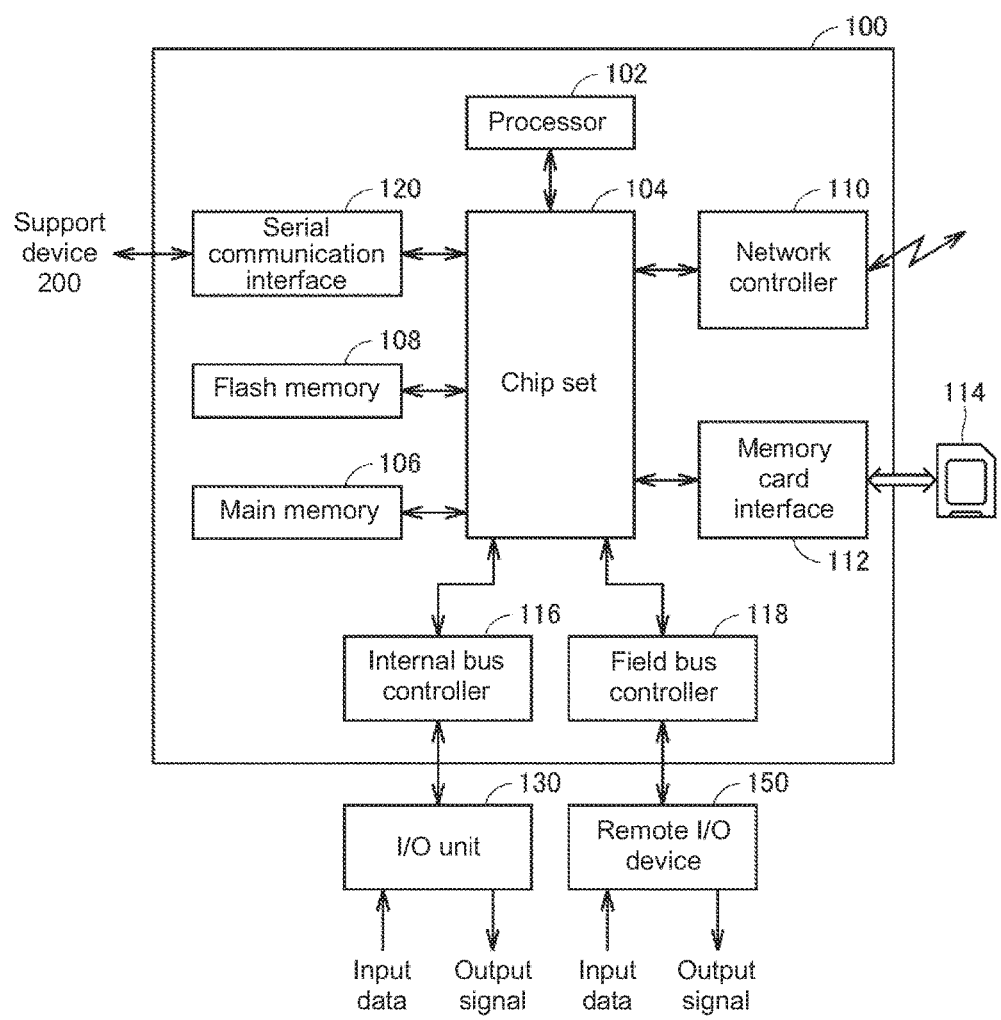
FIG. 2 is a block diagram illustrating a hardware configuration example of a control device of one or more embodiments.

A hardware configuration example of the control device 100 of one or more embodiments will be described below. FIG. 2 is a block diagram illustrating the hardware configuration example of the control device 100 of one or more embodiments. Referring to FIG. 2, in the control device 100, a processor executes a previously-produced user program to perform the control according to the control object. More specifically, the control device 100 includes a processor 102 such as a CPU (Central Processing Unit) and an MPU (Micro-Processing Unit), a chip set 104, a main memory 106, a flash memory 108, a network controller 110, a memory card interface 112, an internal bus controller 116, a field bus controller 118, and a serial communication interface 120.

The processor 102 reads a system program and a user program (neither illustrated), which are stored in the flash memory 108, spreads the system program and the user program on the main memory 106, and executes the system program and the user program, thereby performing the control according to the control object. The system program includes a command code, such as data input and output processing and execution timing processing, which provides a basic function of the control device 100. The user program is arbitrarily designed according to the control object, and includes a sequence program executing sequence control and a motion program executing motion control.

The chip set 104 controls each component to perform processing as a whole of the control device 100. The internal bus controller 116 is an interface that exchanges data with an I/O unit 130 coupled to the control device 100 through an internal bus. The field bus controller 118 is an interface that exchanges data with a remote I/O device 150 (more specifically, an input and output unit 154 included in the remote I/O device 150) coupled to the control device 100 through a field bus.

The internal bus controller 116 and the field bus controller 118 collect the input data input to each input and output unit, and output an arithmetic result (output data) of the processor 102 to the input and output unit. The input and output unit generates an output signal according to the output data.

The memory card interface 112 is configured so as to detachably attach a memory card 114. The memory card interface 112 can write data in the memory card 114, and read various pieces of data (such as the user program and trace data) from the memory card 114.

The network controller 110 controls data exchange through various wired networks or wireless networks.

A part or all of the functions, which are provided when the control device 100 executes the program, may be mounted using a dedicated hardware circuit (such as an ASIC (Application Specific Integrated Circuit) and an FPGA (Field-Programmable Gate Array)).

<C. Hardware Configuration Example of Support Device 200>

For example, the support device 200 of one or more embodiments is made by executing a program implementing a support function on a general-purpose computer. That is, the general-purpose computer, such as a personal computer, which has a general-purpose architecture is used as a hardware configuration example of the support device 200. Because a specific configuration of the general-purpose computer is known, the detailed description is omitted.

<D. Outline of Control Period Optimization Processing>

Figure 3:
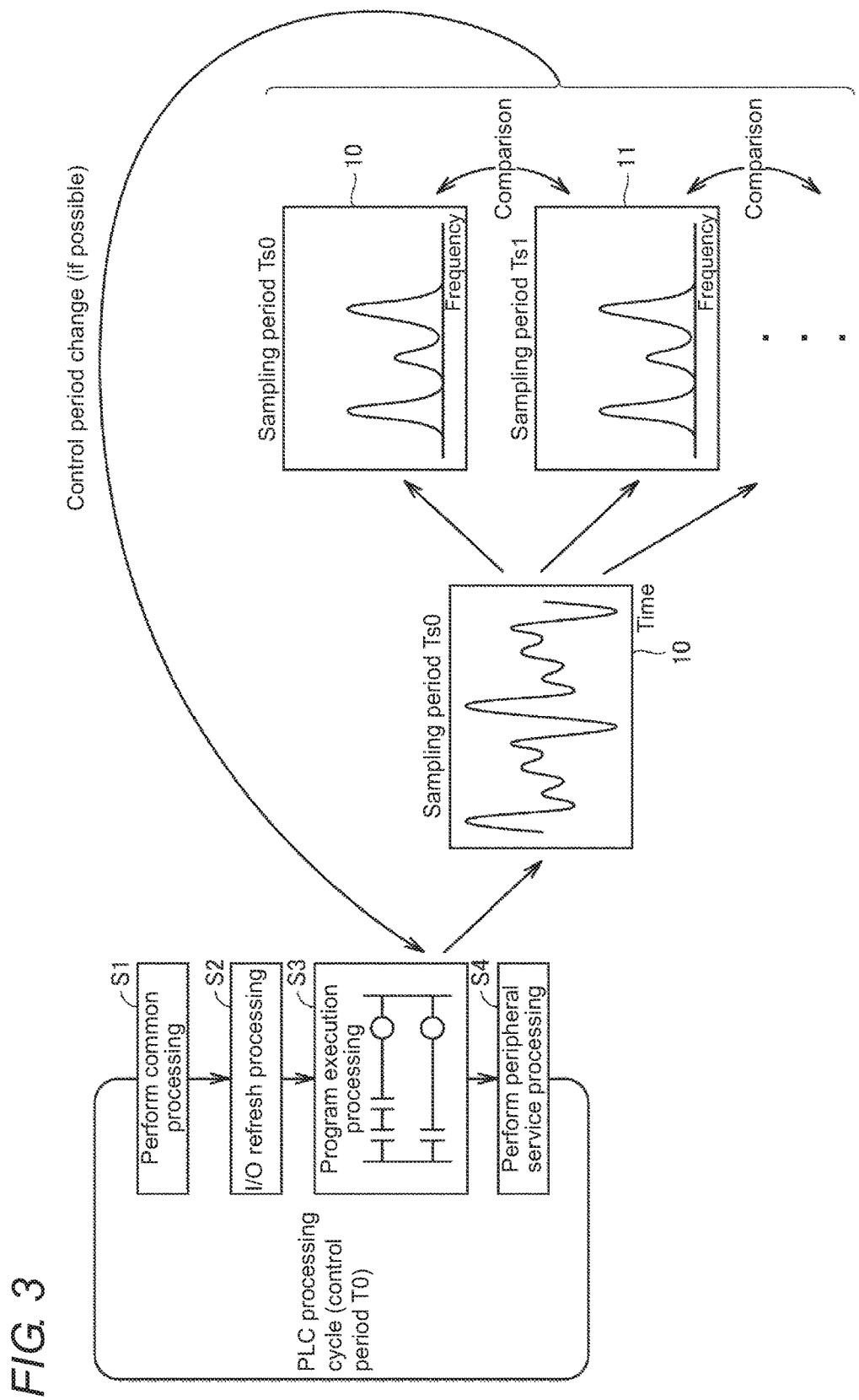
FIG. 3 is a schematic diagram illustrating an outline of control period optimization processing provided by a control device of one or more embodiments.

An outline of control period optimization processing provided by the control device 100 of one or more embodiments will be described below. FIG. 3 is a schematic diagram illustrating the outline of the control period optimization processing provided by the control device 100 of one or more embodiments.

Referring to FIG. 3, typically it is assumed that the control device (PLC) has a processing cycle in which common processing (step S1), I/O refresh processing (step S2), program execution processing (step S3), and peripheral service processing (step S4) are repeated in a predetermined control period. Time necessary for the performance of the common processing, the I/O refresh processing, the program execution processing, and the peripheral service processing is also referred to as a cycle time.

The common processing (step S1) includes processing of diagnosing resources such as a processor and a memory and processing of detecting occurrence of abnormality in each unit.

The I/O refresh processing (step S2) includes processing of collecting the input data, which is generated when the I/O unit converts the signal from the field, and processing of transmitting the output data calculated by the execution of the program to an object I/O unit. In the I/O refresh processing, a period in which the input data is collected and a period in which the output data is transmitted may be set in each piece of data.

In the program execution processing (step S3), basically a previously-prepared user program is executed. The user program performs arithmetic processing necessary for the control of the control object. Typically, the user program includes plural tasks, and an execution period (processing start period/task start-up period) of each task is set based on a control period. For example, the execution period of each task may be set to an integral multiple of the control period. Since the execution period of each task is set to be different from the control period, some tasks are executed in each control period, and some tasks are executed in each four control periods. In the latter, the task is executed over plural control periods in some cases.

The peripheral service processing (step S4) includes additional processing that is not directly related to the control of the control object. For example, the peripheral service processing may include delivery of information indicating log data or an operating situation to a server, processing for access from the support device 200, and setting of various parameters from another device.

Four periodically-repeated pieces of processing in FIG. 3 are typical, and a part of the pieces of processing may be eliminated, plural pieces of processing may integrally be performed, or execution order of the pieces of processing may be exchanged.

Generally, in the control device, it is necessary to periodically repeat the common processing (step S1), the I/O refresh processing (step S2), and the program execution processing (step S3). In one period (control period) of the processing cycle, after the I/O refresh processing and the program execution processing are preferentially performed, the peripheral service processing (step S4) is performed in the remaining time.

On the other hand, with the progress of the intelligent control device 100, a processing content included in the peripheral service processing becomes complicated and diversified, and a demand for allocating more execution time to the peripheral service processing is increasing. Therefore, in the control device 100 of one or more embodiments, a change in the case that a period in which the input data is collected (hereinafter, also referred to as a sampling period) is evaluated, existence and a degree of redundancy of the currently-set control period are determined, and the control period is optimized when the redundancy of the control period is determined to be sufficiently high. More specifically, the optimization of the control period includes processing of changing the control period in a longer direction.

As to a specific method for evaluating the redundancy of the control period, while the sampling period is virtually lengthened, it is determined whether the input data to be collected at that time changes significantly. The sampling period depends on the control period. Even if the sampling period is lengthened, when the significant change of the input data is not generated, it is determined that the redundancy of the control period exists, namely, the control period can be lengthened.

More specifically, as illustrated in FIG. 3, it is assumed that a value (sample value group 10) is collected in each sampling period Ts0 with respect to the input data through the I/O refresh processing while the processing is repeated in a current control period T0. A part of the sample value group 10 is extracted in each sampling period Ts0, and a sample value group 11 to be obtained by the virtual sampling in a sampling period Ts1 is generated. For example, in the case that the sampling period Ts1 is double the sampling period Ts0, the sample value group 11 of the sampling period Ts1 can be generated by extracting every other sample value from the sample value group 10 arrayed in time series. Likewise, the sample value groups can be generated when the sampling period is virtually changed.

The sample value groups in different sampling periods are compared to each other, and missing of information included in the sample value group is determined. The comparison in which a frequency component obtained by frequency conversion of the sample value group is used can be adopted as one of a technique of determining the missing of the information included in the sample value group.

Typically, information about a frequency region such as a coefficient group (that is, a spectrum) of each frequency from information about the sample value group (information about a time region) by FFT (Fast Fourier Transform) or DFT (Discrete Fourier Transform) is generated, and the pieces of information about the frequency region can be compared to each other.

For example, when a substantial difference does not exist between the spectrum of the sampling period Ts0 and the spectrum of the sampling period Ts1 (Ts1>Ts0), the control period can be lengthened up to a time corresponding to the sampling period Ts1. For example, when two spectra that become the object are substantially identical to each other, it can be determined that the substantial difference does not exist between the spectra. That is, the sampling period is too short compared to the time change of the input data of the evaluation object, and it is determined that the redundant sampling is performed. In this case, even if the sampling period is lengthened to time corresponding to the time change generated in the data of the evaluation object, an information amount included in the input data to be collected is not substantially changed.

The sampling period is virtually changed, and the input data to be collected is evaluated. Therefore, the existence and degree of the redundancy of the current control period are determined, and the length of the control period can be optimized.

<E. Effect of Control Period Optimization>

Figure 4A:
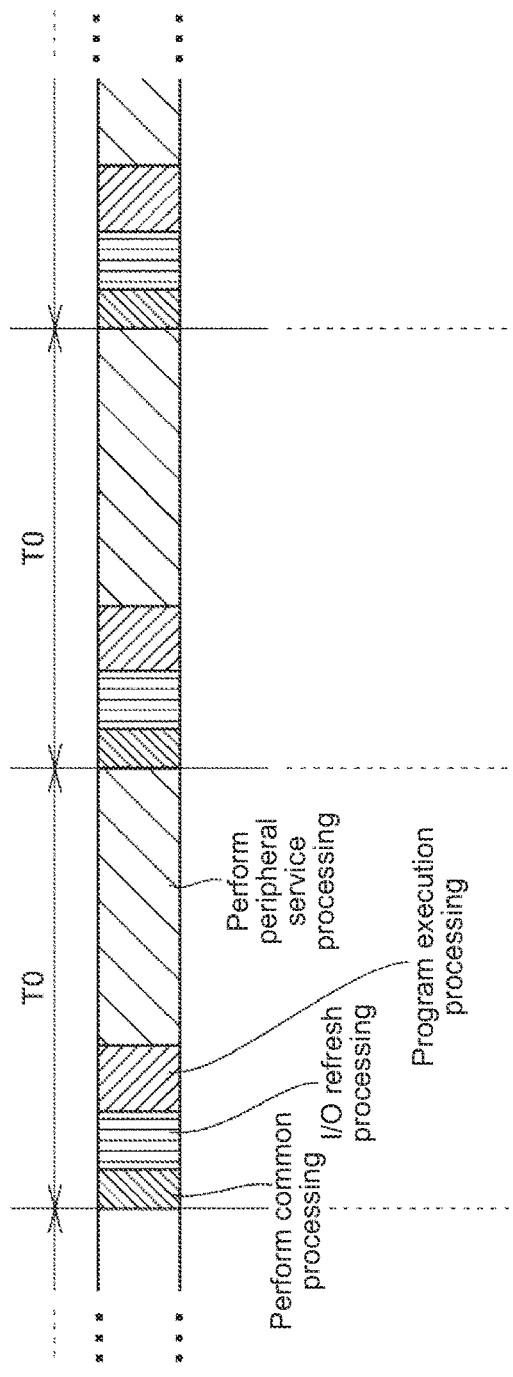
FIGS. 4A and 4B are schematic diagrams illustrating an effect of control period optimization by a control device of one or more embodiments.
Figure 4B:
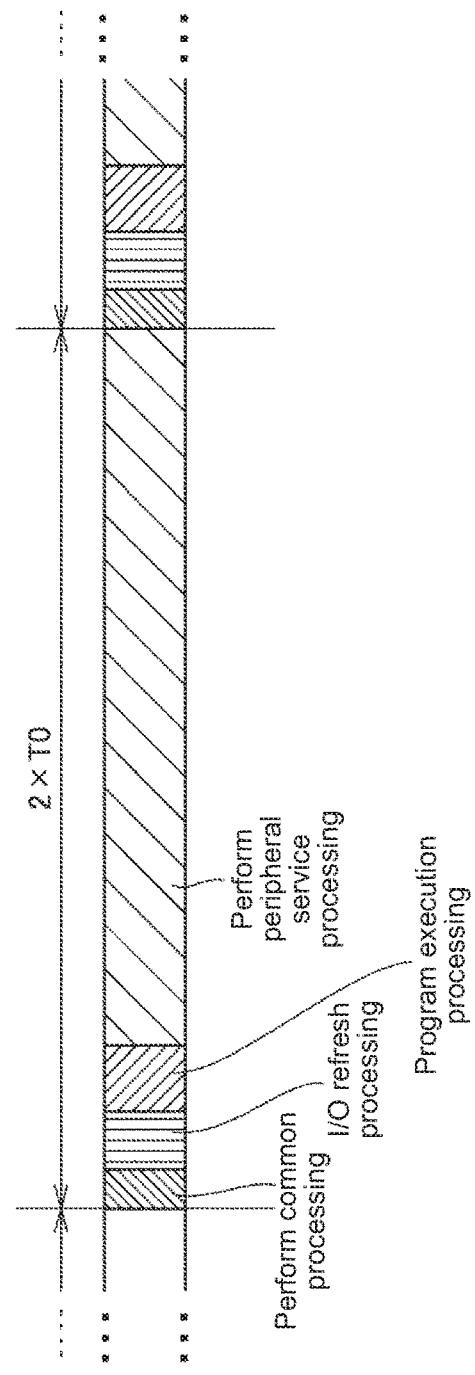

An effect of the control period optimization of one or more embodiments will be described below. FIGS. 4A and 4B are schematic diagrams illustrating the effect of the control period optimization by the control device 100 of one or more embodiments.

As illustrated in FIG. 4A, it is assumed that the processing cycle is repeated in a control period T0 as a current state. That is, in each control period, after the common processing, the I/O refresh processing, and the program execution processing are performed, the peripheral service processing is performed in a remaining time.

When the control period is lengthened double the original control period T0 from the state in FIG. 4A, each piece of processing becomes a performing state in FIG. 4B. That is, the period in which the common processing, the I/O refresh processing, and the program execution processing are performed becomes double the control period T0. A frequency of performing the processing cycle becomes a half, and therefore the more execution time is allocated to the peripheral service processing.

When the more execution time is allocated to the peripheral service processing, various pieces of additional information can easily be processed, and the intelligent control device 100 can be promoted.

For convenience, FIGS. 4A and 4B illustrate the double of the original control period. However, as long as the control period can be changed longer than the original control period, any changed length may be used.

<F. Processing Procedure (User's Initiative)>

Figure 5:
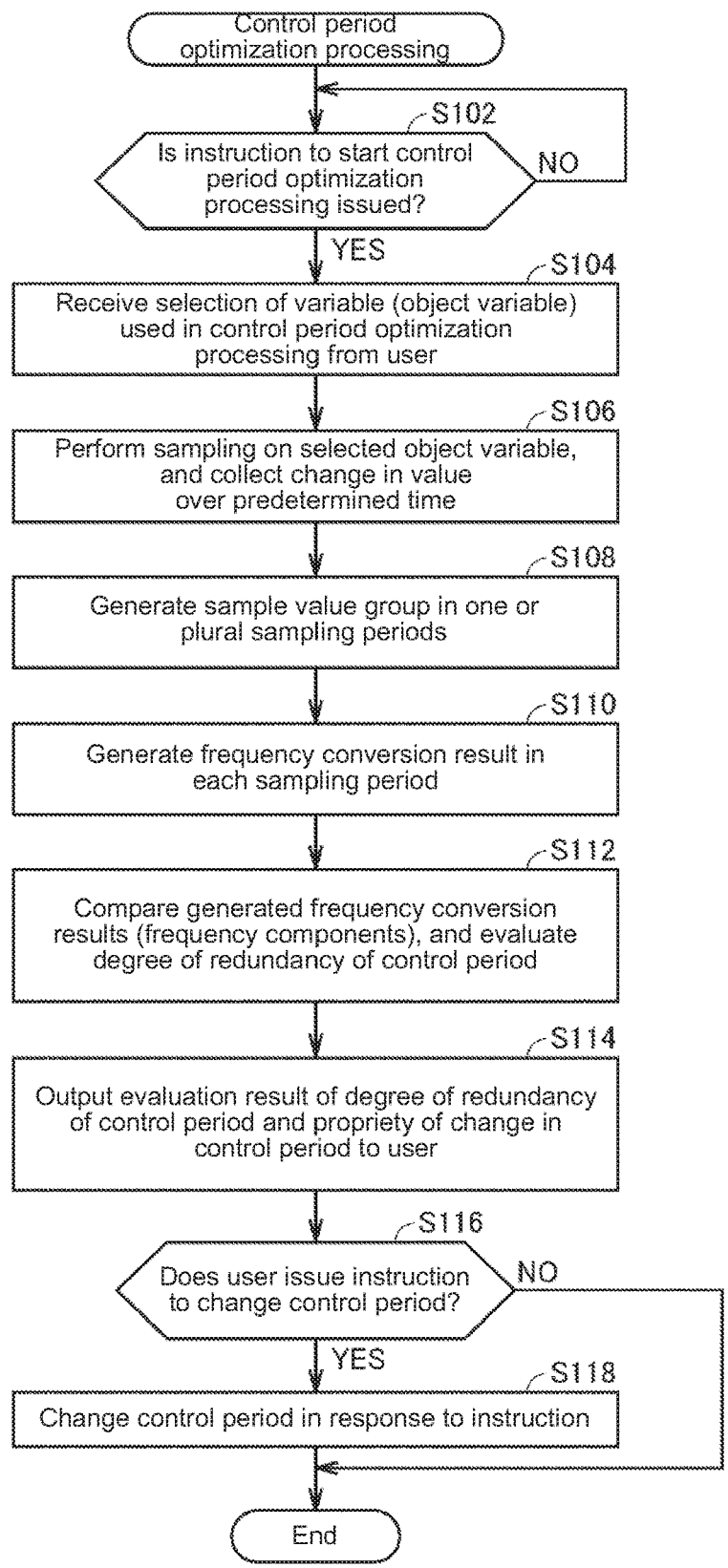
FIG. 5 is a flowchart illustrating a processing procedure related to control period optimization processing (user's initiative) of one or more embodiments.

The processing procedure (user's initiative) related to the control period optimization processing of one or more embodiments will be described below. FIG. 5 is a flowchart illustrating the processing procedure (user's initiative) related to the control period optimization processing of one or more embodiments. Each step in FIG. 5 is performed in conjunction with the control device 100 and support device 200 constituting the control system 1. Which one of pieces of processing is performed by the control device 100 or the support device 200 can arbitrarily be designed. That is, each step may be performed by proper one of the control device 100 and the support device 200.

In the following description, in the control device 100 and the support device 200, a variable programming environment is provided, and a value (real value) such as the input data, the output data, and any piece of internal data dealt with by the devices can be referred to in a form of a variable. Hereinafter, any piece of data is generically named a variable.

Referring to FIG. 5, when an instruction to start the control period optimization processing of one or more embodiments is issued (YES in step S102), the control system 1 receives selection of a variable (hereinafter, also referred to as an object variable) used in the control period optimization processing from a user (step S104).

FIG. 6 is a view illustrating an example of a user interface screen related to step S104 in FIG. 5. Typically, the user interface screen in FIG. 6 is displayed on a display connected to the support device 200. The same holds true for a user interface screen in FIG. 8 (to be described later). The user interface screens in FIGS. 6 and 8 include information about the change from the original control period to the new control period, and receive user's operation.

In step S104 of FIG. 5, for example, a user interface screen 210 in FIG. 6 is displayed on the support device 200. A list of pieces of input data (variables) dealt with by the input and output unit included in the control system 1 is displayed on the user interface screen 210. The list includes a number (a reference numeral 214 in FIG. 6) of the input and output unit that collects the input data, a channel number (port number) (a reference numeral 216 in FIG. 6) to which the input data of the input and output unit is input, a variable name (a reference numeral 218 in FIG. 6) allocated to refer to the input data, a type (a reference numeral 220 in FIG. 6) of the input and output unit that collects the input data, and a comment (a reference numeral 222 in FIG. 6) about the input data.

The user basically selects the variable having the fastest time change as the object variable in the list of pieces of input data. Specifically, a corresponding check box (a reference numeral 212 in FIG. 6) included in the user interface screen 210 is checked. When a user presses an OK button 224, the selection of the object variable is completed. Not one but plural object variables may be selected.

Thus, a function of selecting the variable (object variable) used to decide the optimal control period in the variables updated through the I/O refresh processing is provided in the control system 1.

Referring to FIG. 5 again, the control device 100 performs the sampling on the selected object variable, and collects a change in value over a predetermined period (step S106). The sample value group in one or plural sampling periods different from each other is generated from a value (that is, the sample value group in the current control period) of the collected object variable (step S108). The frequency conversion is performed on the sample value group in the sampling period, and a frequency conversion result (typically, an FFT result) is generated in each sampling period (step S110). A frequency conversion result includes the frequency component included in the corresponding sample value group.

Figure 7:
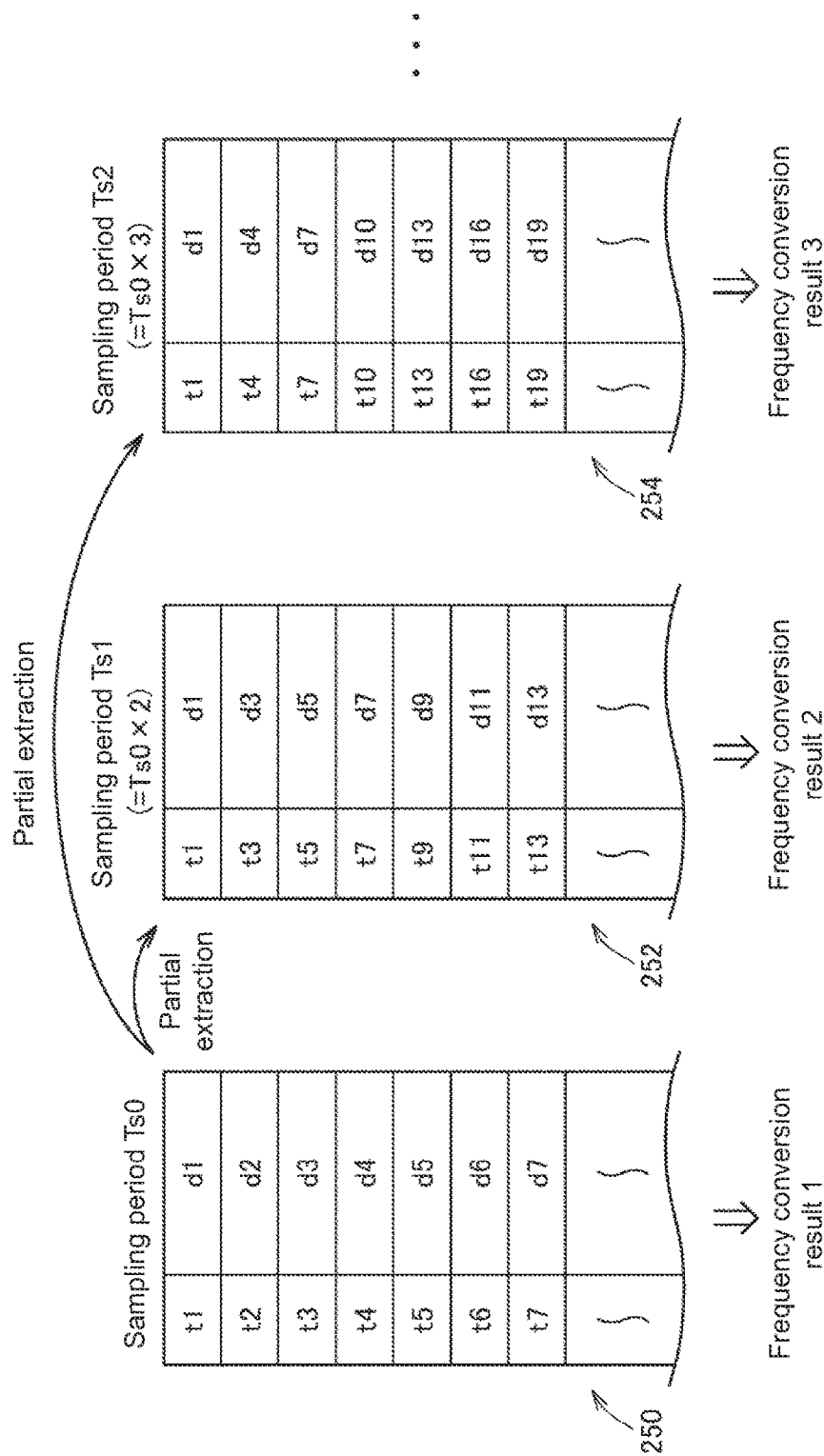
FIG. 7 is a schematic diagram illustrating a mounting example of sample value group generation processing related to steps S8 and S10 in FIG. 5.

FIG. 7 is a schematic diagram illustrating a mounting example of sample value group generation processing related to steps S108 and S110 in FIG. 5. Referring to FIG. 7, a sample value group 250 is obtained by sampling the input data in the sampling period Ts0 in the current control period. Sample value groups 252, 254 of a sampling period Ts1 (=sampling period Ts0×2), a sampling period Ts2 (=sampling period Ts0×3), . . . are generated by partially extracting the sample value group 250.

For example, for the sampling period Ts1 that is double the sampling period Ts0 in the current control period, the sample value group 252 in the sampling period Ts1 can be generated by partially extracting every other sample values d1, d2, d3, . . . (in the example of FIG. 7, odd numbers) included in the sample value group 250 in the sampling period Ts0. Likewise, for the sampling period Ts2 that is triple the sampling period Ts0 in the current control period, the sample value group 254 in the sampling period Ts2 can be generated by partially extracting every two sample values d1, d2, d3, . . . included in the sample value group 250 in the sampling period Ts0. The frequency conversion is performed on the sample value group in the sampling period, and the frequency conversion result (frequency component) is generated.

The sample value group in the different sampling period may be generated by not the method of partially extracting the sample value included in the sample value group in FIG. 7, but lengthening the real execution period of the I/O refresh processing.

Referring to FIG. 5 again, the generated frequency conversion results (frequency components) are compared to each other, and the degree of the redundancy of the control period is evaluated (step S112). Specifically, whether the frequency conversion results in the sampling periods are substantially identical to each other is determined. That is, the maximum sampling period in which the substantially same frequency conversion result as the frequency conversion result in the sampling period Ts0 is obtained is specified. The evaluation result of the degree of the redundancy of the control period and propriety of the change of the control period are output to the user (step S114).

Figure 8:
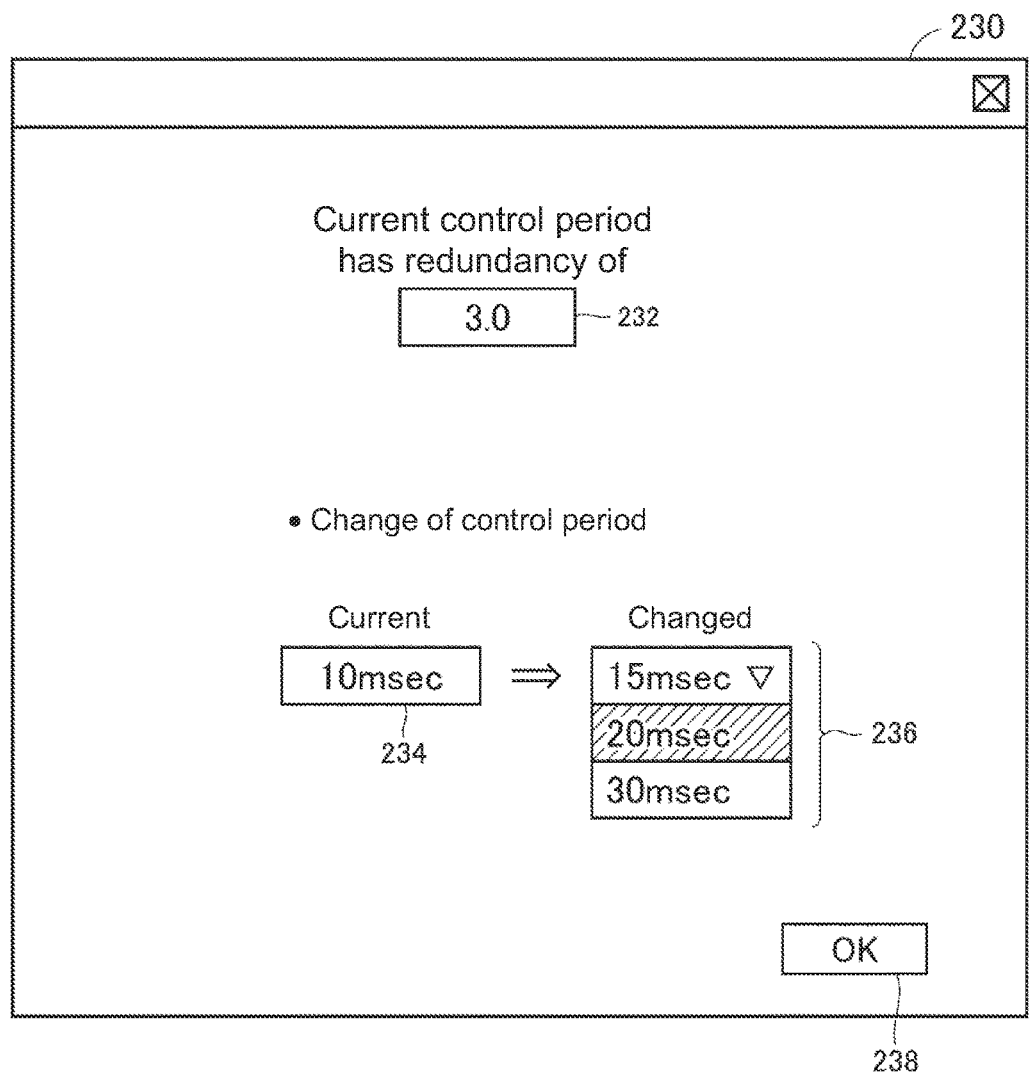
FIG. 8 is a view illustrating an example of a user interface screen related to step S14 in FIG. 5.

FIG. 8 is a view illustrating an example of a user interface screen related to step S114 in FIG. 5. In step S114, for example, the user interface screen 230 in FIG. 8 is displayed on the support device 200. The evaluation result (a reference numeral 232 in FIG. 8) of the degree of redundancy of the control period is displayed on the user interface screen 230. A list (a reference numeral 236 in FIG. 8) of changeable control periods is displayed in addition to the current control period (a reference numeral 234 in FIG. 8).

The user can select the control period from the selectable list according to a situation while checking a content of the user interface screen 230. The user selects the new control period and presses an OK button 238, thereby completing the change of the control period.

Referring to FIG. 5 again, when the user issues an instruction to change the control period (YES in step S116), the control period is changed in response to the instruction (step S118). That is, in the control period optimization processing of FIG. 5, the control period is changed by receiving the user's operation under the condition that the frequency component in the pre-change control period is identical to the frequency component in the post-change control period. The execution period of each task included in the user program is also updated according to the change of the control period. When the user does not issue the instruction to change the control period (NO in step S116), the current control period is maintained.

The control period optimization processing is completed by the above processing procedure.

<G. Processing Procedure (Automatic)>

In the processing procedure (the user's initiative), by way of example, the user issues the instruction to change the control period after the control device 100 and the support device 200 propose a possibility of changing the control period to the user based on the frequency conversion result of the object variable. The control device 100 may automatically perform the function.

For example, in the case that a behavior of the control object changes according to an operation mode or an operation situation, the control period may automatically be changed according to the situation.

Figure 9:
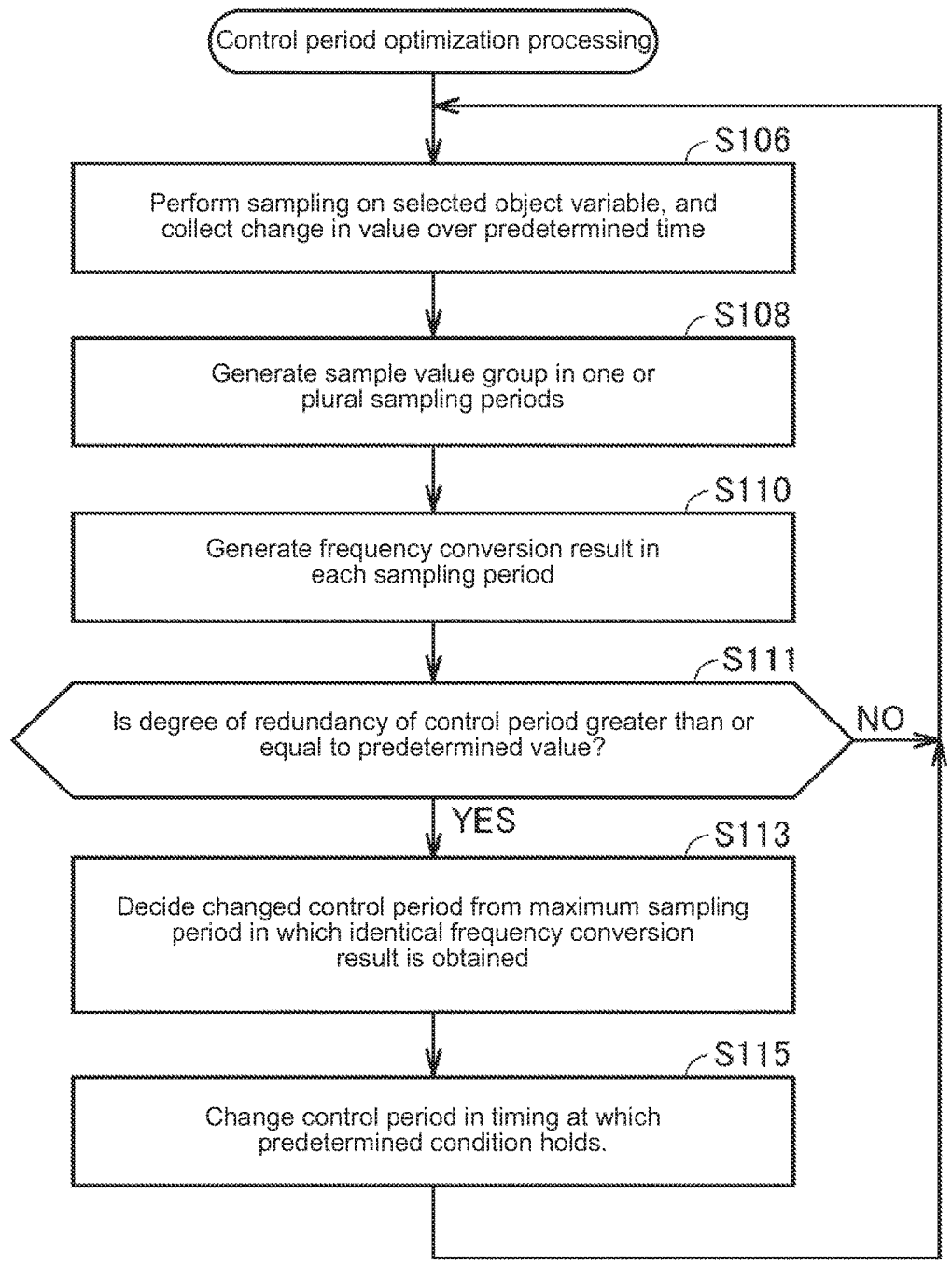
FIG. 9 is a flowchart illustrating a processing procedure related to control period optimization processing (automatic) of one or more embodiments.

FIG. 9 is a flowchart illustrating a processing procedure (automatic) related to the control period optimization processing of one or more embodiments. Each step in FIG. 9 is basically assumed to be performed by the control device 100 constituting the control system 1. However, the control device 100 and the support device 200 may perform the whole processing in conjunction with each other. The substantially same step as the step of the control procedure in FIG. 5 is designated by the same step number.

It is assumed that the variable (object variable) used in the control period optimization processing is previously selected in the processing procedure of FIG. 9.

Referring to FIG. 9, the control device 100 performs the sampling on the object variable, and collects the change in value over the predetermined period (step S106). The sample value group in one or plural sampling periods different from each other is generated from the value (that is, the sample value group in the current control period) of the collected object variable (step S108). The frequency conversion is performed on the sample value group in the sampling period, and a frequency conversion result (typically, an FFT result) is generated in each sampling period (step S110). A frequency conversion result includes the frequency component included in the corresponding sample value group.

The generated frequency conversion results (frequency components) are compared to each other, and whether the degree of the redundancy of the control period is greater than or equal to a predetermined value is evaluated (step S111). When the degree of the redundancy of the control period is less than the predetermined value (NO in step S111), the pieces of processing from step S106 are repeated.

When the degree of the redundancy of the control period is greater than or equal to the predetermined value (YES in step S111), the control device 100 specifies the maximum sampling period in which the substantially same frequency conversion result as the frequency conversion result in the sampling period Ts0 is obtained, and decides the changed control period (step S113). The control device 100 changes the control period to the control period decided in step S113 in timing at which a predetermined condition holds (step S115). That is, in the control period optimization processing of FIG. 9, the control period is changed under the condition that the frequency component in the pre-change control period is identical to the frequency component in the post-change control period. The pieces of processing from step S106 are repeated.

The control period is maintained at an optimal value by the above processing procedure.

<H. Software Configuration and Functional Configuration>

Figure 10:
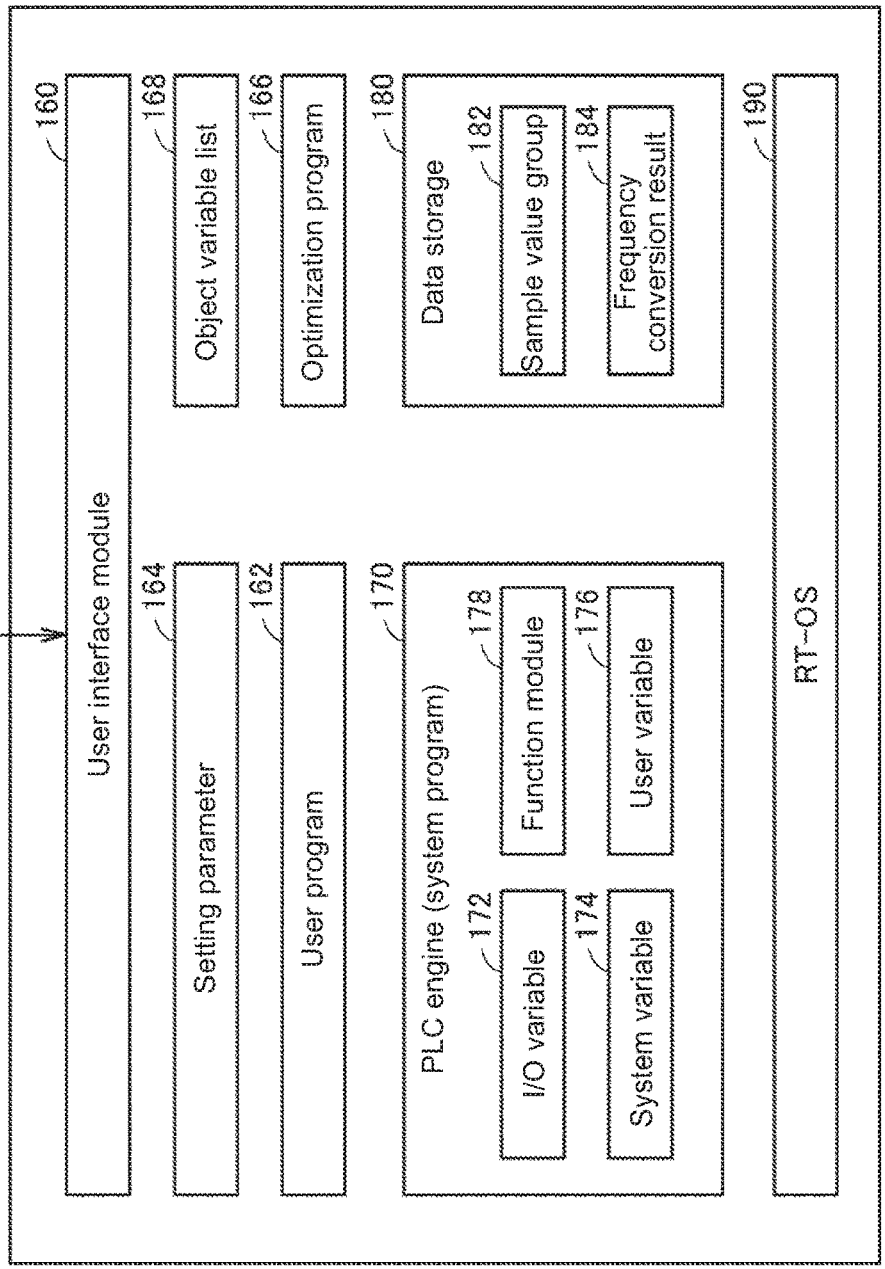
FIG. 10 is a schematic diagram illustrating a software configuration example of a control device of one or more embodiments.

A software configuration and a functional configuration in the control system 1 of one or more embodiments will be described below. FIG. 10 is a schematic diagram illustrating a software configuration example of the control device 100 of one or more embodiments.

Referring to FIG. 10, the control device 100 executes a real-time OS (Operating System) (RT-OS) 190, and a PLC engine 170, a user program 162, and an optimization program 166 are mounted in the execution environment.

The PLC engine 170 is a module that performs basic processing executing the user program 162 and I/O processing. The PLC engine 170 includes a variable (such as an I/O variable 172, a system variable 174, and a user variable 176) updated in each control period and a function module 178 called from the user program 162. The I/O variable 172 indicates the input data and output data, which are collected or output by the I/O unit that can be used by the control device 100. The I/O variable 172 may include the input data and output data, which are managed by another control device. The system variable 174 indicates a value of a hardware or software state of the control device 100. The user variable 176 indicates a real value of the variable used in the user program 162.

The user program 162 is a set of a series of commands arbitrarily designed according to the control object. The user program 162 can include one or plural tasks. A setting parameter 164 includes the control period, the execution period and a priority of each task, and a sampling number of the variable. Thus, a function of setting and storing the sampling number related to the I/O refresh is provided.

The optimization program 166 is a program module that performs the control period optimization processing of one or more embodiments. The optimization program 166 performs the control period optimization processing with respect to the object variable designated by an object variable list 168. The data (such as a sample value group 182 and a frequency conversion result 184) generated by the optimization program 166 is stored in a data storage 180.

The object variable list 168 includes information specifying the object variable selected by the user. That is, the function of selecting and storing the object variable related to the control period optimization processing of one or more embodiments is provided.

A user interface module 160 that performs conversation between the module or program and the user is also mounted. The user interface module 160 performs the above processing by exchanging information with the support device 200. Typically, the user interface module 160 transfers the information (the user's operation and the user's setting) from the support device 200 to the module or program, and outputs a response from the module or program to the support device 200.

When the software configuration in FIG. 10 is adopted, the control device 100 implements the following functional configuration.

Figure 11:
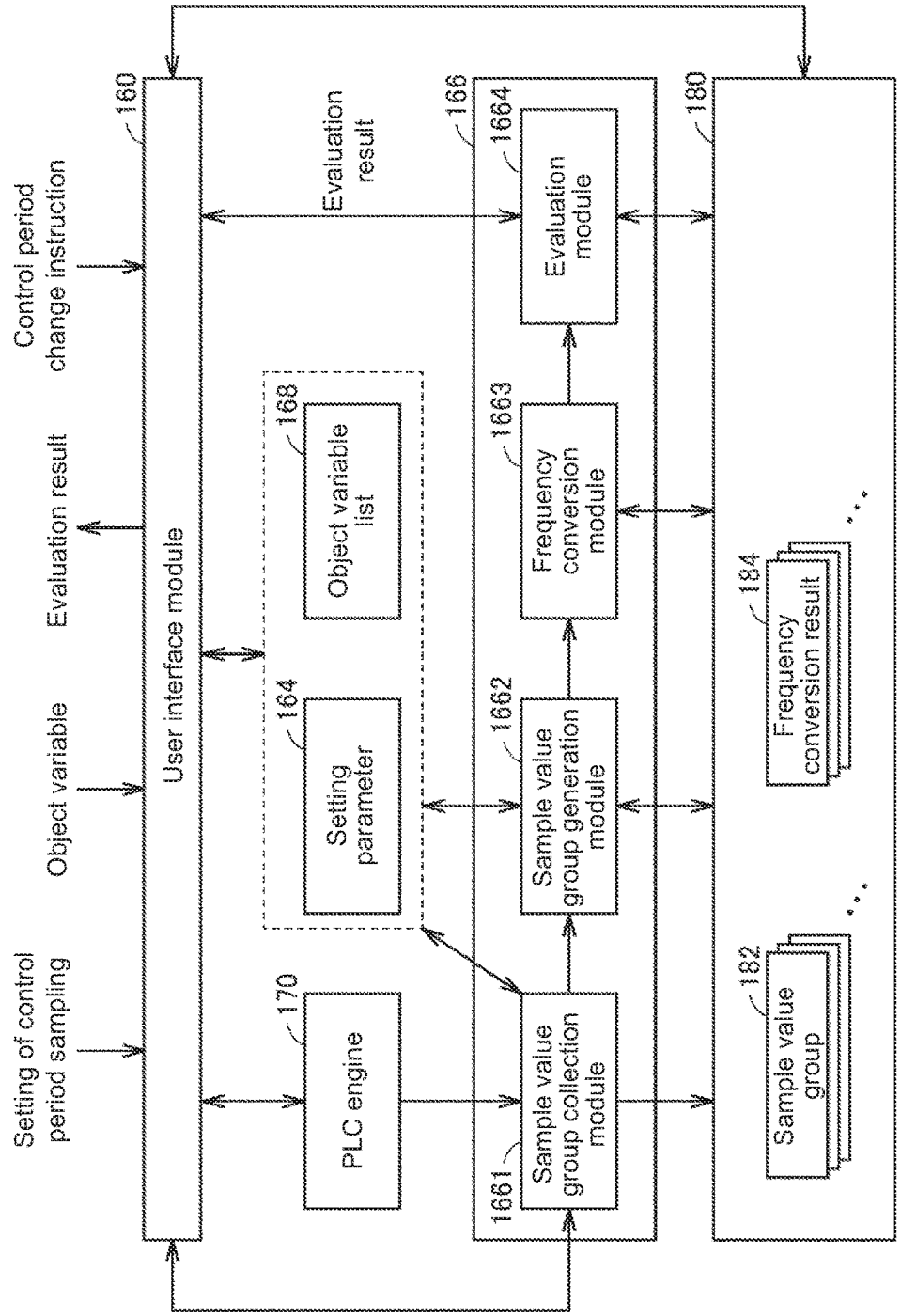
FIG. 11 is a schematic diagram illustrating a functional configuration example of a control device of one or more embodiments.

FIG. 11 is a schematic diagram illustrating a functional configuration example of the control device 100 of one or more embodiments. Referring to FIG. 11, the optimization program 166 of the control device 100 includes a sample value group collection module 1661, a sample value group generation module 1662, a frequency conversion module 1663, and an evaluation module 1664.

The sample value group collection module 1661 provides a data collection function in order to optimize the control period, and obtains the sample value group that is collected by repeatedly performing the I/O refresh processing in the current control period. Specifically, the sample value group collection module 1661 periodically samples a value of an I/O variable 172 (see FIG. 10) updated every time by the PLC engine 170 according to the setting parameter 164 with respect to the object variable designated in the object variable list 168, thereby generating the sample value group in the sampling period Ts0.

The sample value group generation module 1662 obtains the sample value group that is collected in the case that the I/O refresh processing is repeatedly performed in the control period longer than the current control period. That is, the sample value group generation module 1662 generates the sample value group in the sampling period (>Ts0) except for the sampling period Ts0 (see FIG. 7). An integral multiple of the sampling period Ts0 may be used as the sampling period except for the sampling period Ts0. That is, the integral multiple of the current control period may be used as the control period that becomes an optimization candidate of the control period.

For example, a double or a triple of the sampling period Ts0 may be used as the control period. Thus, the sample value group generation module 1662 may obtain each sample value group with respect to plural control periods longer than the control period.

The frequency conversion module 1663 provides a function of calculating the frequency component in order to optimize the control period and a function of storing the calculated frequency component. At this point, the frequency conversion module 1663 lengthens the sampling period of the sample value group related to the collected object variable, and calculates the frequency component included in the sample value group. That is, the frequency conversion module 1663 generates the frequency conversion result 184 indicating the frequency component by performing the frequency conversion on each of the sample value groups generated by the sample value group collection module 1661 and the sample value group generation module 1662. Through the above procedure, the frequency conversion module 1663 calculates the frequency component from the collected sample value group. The frequency conversion result 184 is stored in the data storage 180.

Typically the frequency conversion module 1663 generates the frequency component by performing the FFT or DFT on the object sample value group.

The evaluation module 1664 is a module that provides a function of comparing the frequency components. The evaluation module 1664 determines whether the frequency component included in the sample value group corresponding to the current control period is substantially identical to the frequency component included in the sample value group corresponding to the longer control period. That is, the evaluation module 1664 compares calculated frequency conversion results 184 to each other, and evaluates that the redundancy of the currently-set control period exists when a substantial difference does not exist therebetween. The evaluation module 1664 determines up to which one of the sampling periods substantial identity is maintained, and calculates a ratio of the sampling period capable of maintaining substantial identity and the current sampling period Ts0 as a degree of the redundancy. That is, when the substantial difference does not exist between the calculated frequency conversion results 184, the control period defined by the setting parameter 164 can be lengthened.

As illustrated in FIG. 8, the evaluation module 1664 determines whether the sampling period Ts0 corresponding to the current control period is identical to the sampling period Ts1 corresponding to one control period longer than the current control period when comparing the sampling period Ts0 and the sampling period Ts1. The evaluation module 1664 notifies the user whether the frequency component in the sampling period Ts0 is identical to the frequency component in the sampling period Ts1. On the other hand, in the case that the frequency component is evaluated in the plural control periods, the evaluation module 1664 may decide the longest control period in the substantially same frequency component as the frequency component corresponding to the current control period by comparing the frequency components included in the sample value groups.

The evaluation module 1664 outputs the evaluation result to the support device 200 through the user interface module 160. That is, in the case that the frequency component corresponding to the current control period is substantially identical to the frequency component corresponding to the longer control period, the user interface module 160 provides a user interface that changes the current control period to the longer control period. The control period of the control device 100 is lengthened in response to the control period change instruction from the user. The user interface module 160 updates the value of the control period stored in the setting parameter 164 in response to the user's operation (the control period change instruction from the user).

When the control period is determined to be lengthened through the control period optimization processing, the control period may automatically be changed without waiting for the user's operation.

The control period optimization processing of one or more embodiments is performed by the functional configuration.

<I. Evaluation Technique>

Some techniques of evaluating whether the control period is lengthened will be described below.

(i1: Spectrum)

As illustrated in FIG. 3, the spectra (waveforms) that are the frequency conversion result of the sample value group are compared to each other, and whether the spectra are substantially identical to each other can be evaluated. In this case, a correlating value between the waveforms (typically, a multidimensional correlating value) is calculated, and whether the spectra are substantially identical to each other or similarity thereof may be evaluated based on the calculated correlating value. For example, the correlating value between the waveforms can be calculated using a technique such as a principal component analysis. Known any method can be adopted as the correlating value calculation method.

(i2: Frequency of Peak Wavelength)

Figure 12:
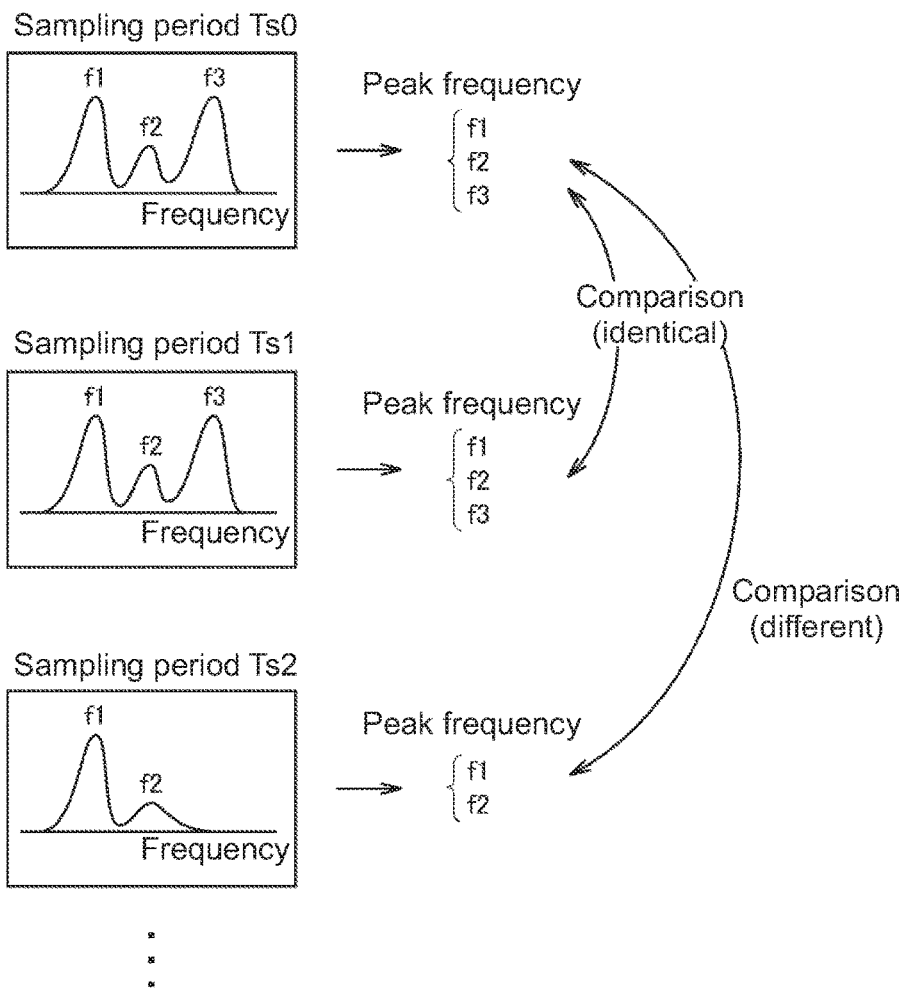
FIG. 12 is a schematic diagram illustrating an example of an evaluation method related to control period optimization processing of one or more embodiments.

The existence of the identity may be evaluated based on a wavelength component included in the result in which the frequency conversion is performed on the sample value group. FIG. 12 is a schematic diagram illustrating an example of an evaluation method related to the control period optimization processing.

Referring to FIG. 12, a peak frequency included in the frequency conversion result for each of the sampling periods Ts0, Ts1, Ts2, . . . is extracted. The existence of the identity or the similarity may be evaluated by comparing sets of peak frequencies with respect to each sampling frequency.

In the example of FIG. 12, peak frequencies f1, f2, f3 are extracted from the frequency conversion results of the sampling periods Ts0 and Ts1, and the sampling periods Ts0 and Ts1 are evaluated to be substantially identical to each other. On the other hand, only the peak frequencies f1, f2 are extracted from the frequency conversion result of the sampling period Ts2, and the generation of the difference can be determined.

Thus, the identity or the similarity can be evaluated based on the number of peak frequencies included in the generated frequency conversion result and/or the frequency itself.

Alternatively, because an upper limit of the frequency at which the sampling can be performed is restricted as the sampling period is lengthened, the identity or the similarity can be evaluated based on a high-frequency component included in the frequency conversion result.

In the example of FIG. 12, while the peak frequency f3 is extracted as the maximum peak frequency from the frequency conversion result with respect to the sampling periods Ts0 and Ts1, only the peak frequency f2 (<f3) is extracted as the maximum peak frequency from the frequency conversion result with respect to the sampling period Ts2.

From principle knowledge of the sampling, the identity or the similarity may be evaluated by paying attention to the maximum frequency included in each frequency conversion result.

(i3: Time Region)

The waveforms in the time region may be compared to each other instead of the processing in which the information about the frequency region is used. In this case, for example, the correlating value between the waveforms in the time region (typically, a multidimensional correlating value) is calculated after a time axis is adjusted, and whether the waveforms are substantially identical to each other or similarity may be evaluated based on the calculated correlating value.

The above technique is described by way of example and not limited thereto. Any technique may be adopted as long as the two time waveforms or frequency conversion results can be compared to each other to evaluate whether the time waveforms or frequency conversion results are identical to each other.

<J. Monitoring Function (Additional Function)>

In the case that the control period is changed through the control period optimization processing in the control system 1 of one or more embodiments, a function of monitoring soundness of the repetitive performance of the processing cycle in the changed control period may be added. A monitoring function as such an additional function will be described below.

In the case that the control period is lengthened, the execution period of the I/O refresh processing is also lengthened. While a refresh period of the input data from the field is lengthened, there is a possibility that the time change of the input data becomes quicker compared with the case that the optimization processing is performed. Therefore, it is preferable to mount the monitoring function of shortening the control period or making a notification of the change in characteristic of the input data in the case that the characteristic of the input data changes.

The monitoring function additionally mounted on the control system 1 of one or more embodiments determines whether the sample value collected through the I/O refresh processing can properly be collected in the post-change control period while the series of pieces of processing including the I/O refresh processing and the program execution processing is repeatedly performed in the post-change control period.

Similarly to the control period optimization processing, the monitoring function can monitor validity of the currently-set (post-change) control period by evaluating the identity or similarity of each of the sample value groups having different sampling periods in a predetermined period. The variable of the monitoring object may be the object variable used in the previous optimization processing or a different object variable. Basically, in all the variables that become the object of the I/O refresh processing, an arbitrarily-selected variable can be used as the monitoring object.

However, sufficiently short sampling period cannot be ensured in some cases because the execution period of the I/O refresh processing is lengthened with increasing control period. In such cases, the necessary sampling period is ensured on the input and output unit side, and the sampling results of plural times may be collected in the I/O refresh processing.

Figure 13:
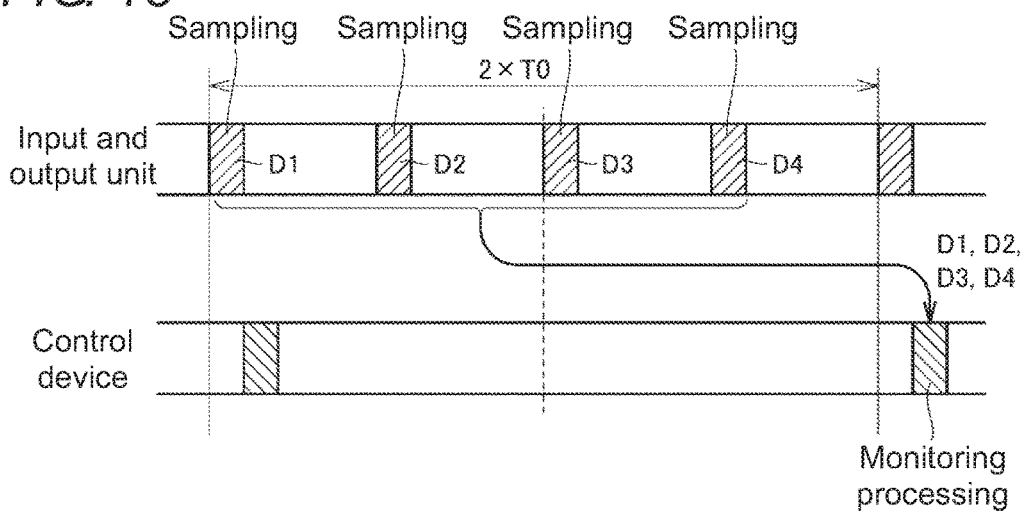
FIG. 13 is a schematic diagram illustrating an example of a monitoring function related to control period optimization processing of one or more embodiments.

FIG. 13 is a schematic diagram illustrating an example of a monitoring function related to the control period optimization processing of one or more embodiments. Referring to FIG. 13, for example, it is considered that the processing cycle is performed while the original control period T0 is lengthened double. In this case, originally the input data is collected in the current control period. However, for example, the input and output unit samples the input data in a period shorter than the current control period, and the plural pieces of input data collected after the previous I/O refresh processing may be obtained in the I/O refresh processing.

In the example of FIG. 13, the input and output unit performs the sampling in a time period corresponding to a half of the pre-change control period T0, and pieces of input data D1, D2, D3, D4 obtained by four-time sampling can be collected in each piece of I/O refresh processing. Whether the current control period is proper can be monitored by performing the processing similar to the optimization processing using the input data group collected in the shorter sampling period.

At this point, the evaluation may be made based on the frequency conversion result generated in the pre-charge control period of the object variable used in the previous optimization processing.

When the change in frequency conversion result of the monitoring object is detected through the monitoring processing, the user may be notified of the change in frequency conversion result. The processing of restoring the control period to the original control period may be performed in response to the user's operation, or the control period may automatically be restored to the original control period. The control function of the main body can be maintained by mounting the monitoring function even if some sort of state change is generated in the control object.

<K. Other Embodiments>

In the mounting form in FIG. 10, the optimization program 166 existing in the control device 100 implements the main function and processing. However, the mounting form in FIG. 10 is not limited thereto. For example, the whole or part of the processing may be mounted on the support device 200 or an external device (not illustrated) (for example, a processing function on a cloud). In this case, typically, the control device 100 collects the sample value group by sampling the object variable according to the currently-set control period. The collected sample value group is transmitted to the control device 100, the support device 200, or a processing body mounted on an external device. The processing body performs the necessary processing including the evaluation processing. When the current control period is determined to be redundant, the determination result and the post-change control period are returned from the processing body.

That is, the control period optimization processing of one or more embodiments can be mounted as appropriate using the technology according to each era.

<L. Advantage>

Generally, the control period is set in consideration of the cycle time of the processing cycle including the I/O refresh processing and the program execution processing in many cases. However, the setting of the control period depends on an individual difference of the user, and the control period is too redundant in some cases. That is, there is a possibility that the control period shorter than originally necessary is set. In such cases, the time allocated to the peripheral service processing is restricted.

On the other hand, in the control system 1 and the control period optimization processing performed by the control system 1 of one or more embodiments, the existence and degree of the redundancy of the control period are determined according to the state of the object variable obtained through the I/O refresh processing. When the sufficient redundancy exists, the execution time allocated to the peripheral service processing can be increased by lengthening the control period.

After the control period is lengthened, some sort of change is generated in the input data collected through the I/O refresh processing, and the control period is determined to be shortened. At this point, the monitoring processing of restoring the control period to the original control period can be also performed according to the determination result. The combination of these pieces of processing enables setting of efficient and safety control period.

The disclosed embodiments are illustrative in all respects, but are not restrictive. The scope of the present invention is indicated by not the above description but the claims, and it is intended that the meanings equivalent to the claims and all the changes within the scope of the present invention are included in the scope of the present invention.

The invention claimed is:

1. A control system comprising: a remote device; and a control device that repeatedly performs a series of pieces of processing comprising input/output (I/O) refresh processing and program execution processing in a first control period having a first length, the control device exchanging data with the remove device over a network, the control device comprising:
    a processor configured with a program to perform operations comprising:
        obtaining a first sample value group that is collected by repeatedly performing the I/O refresh processing in the first control period;
        obtaining a second sample value group that is collected in response to the I/O refresh processing being repeatedly performed in a second control period having a second length longer than the first length of the first control period;
        determining whether a first frequency component comprised in the first sample value group and a second frequency component comprised in the second sample value group comprise a degree of redundancy with each other that is greater than or equal to a predetermined value; and
        changing the first length of the first control period to the second length of the second control period in response to the first frequency component and the second frequency component comprising the degree of redundancy with each other that is greater than or equal to the predetermined value, wherein
        the processor is configured to perform the series of pieces of processing comprising the input/output (I/O) refresh processing and the program execution processing in the changed first control period in response to the change in the first length of the first control period to the second length.

2. The control system according to claim 1, wherein the processor is configured with the program to perform operations such that changing the first length of the first control period to the second length of the second control period comprises providing information about the change in the first length of the first control period to the second length of the second control period via a user interface that receives a user interface operation.

3. The control system according to claim 2, wherein the processor is configured with the program to perform operations such that changing the first length of the first control period to the second length of the second control period comprises notifying on the user interface whether the first frequency component and the second frequency component comprise the degree of redundancy with each other that is greater than or equal to the predetermined value.

4. The control system according to claim 2, wherein the processor is configured with the program to perform operations such that changing the first length of the first control period to the second length of the second control period comprises receiving the user interface operation to change the first length of the first control period to the second length of the second control period.

5. The control system according to claim 1, wherein the processor is configured with the program to perform operations such that:
obtaining the second sample value group comprises obtaining the second sample value group with respect to each second control period of a plurality of the second control periods, and
determining whether the first frequency component and the second frequency component comprise the degree of redundancy, comprises deciding a longest second control period in a plurality of second frequency components that comprises the degree of redundancy with the first frequency component that is greater than or equal to the predetermined value by comparing the plurality of the second frequency components comprised in the second sample value groups.

6. The control system according to claim 1, wherein the second control period comprises an integral multiple of the first control period.

7. The control system according to claim 1, wherein the processor is configured with the program to perform operations further comprising generating a frequency component by performing a fast Fourier transform on at least one of the first sample value group and the second sample value group.

8. The control system according to claim 1, wherein the processor is configured with the program to perform operations further comprising determining whether a sample value collected through the I/O refresh processing is properly collected in the changed first control period while the series of pieces of processing is repeatedly performed in the changed first control period by determining a validity of the changed first control period.

9. The control system according to claim 3, wherein the processor is configured with the program to perform operations such that changing the first length of the first control period to the second length of the second control period comprises operation as the change unit that receives the user interface operation to change the first length of the first control period to the second length of the second control period.

10. The control system according to claim 2, wherein the processor is configured with the program to perform operations such that:
obtaining the second sample value group comprises obtaining the second sample value group with respect to each second control period of a plurality of the second control periods, and
determining whether the first frequency component and the second frequency component comprise the degree of redundancy, comprises deciding a longest second control period in a plurality of second frequency components that comprises the degree of redundancy with the first frequency component that is greater than or equal to the predetermined value by comparing the plurality of the second frequency components comprised in the second sample value groups.

11. The control system according to claim 3, wherein the processor is configured with the program to perform operations such that:
obtaining the second sample value group comprises obtaining the second sample value group with respect to each second control period of a plurality of the second control periods, and
determining whether the first frequency component and the second frequency component comprise the degree of redundancy, comprises deciding a longest second control period in a plurality of second frequency components that comprises the degree of redundancy with the first frequency component that is greater than or equal to the predetermined value by comparing the plurality of the second frequency components comprised in the second sample value groups.

12. The control system according to claim 4, wherein the processor is configured with the program to perform operations such that:
obtaining the second sample value group comprises obtaining the second sample value group with respect to each second control period of a plurality of the second control periods, and
determining whether the first frequency component and the second frequency component comprise the degree of redundancy, comprises deciding a longest second control period in a plurality of second frequency components that comprises the degree of redundancy with the first frequency component that is greater than or equal to the predetermined value by comparing the plurality of the second frequency components comprised in the second sample value groups.

13. The control system according to claim 9, wherein the processor is configured with the program to perform operations such that:
obtaining the second sample value group comprises obtaining the second sample value group with respect to each second control period of a plurality of the second control periods, and
determining whether the first frequency component and the second frequency component comprise the degree of redundancy, comprises deciding a longest second control period in a plurality of second frequency components that comprises the degree of redundancy with the first frequency component that is greater than or equal to the predetermined value by comparing the plurality of the second frequency components comprised in the second sample value groups.

14. A control device comprising:
a processor configured with a program to perform operations comprising:
repeatedly performing a series of pieces of processing comprising input/output (I/O) refresh processing and program execution processing in a first control period having a first length;

obtaining a first sample value group that is collected by repeatedly performing the I/O refresh processing in the first control period;

obtaining a second sample value group that is collected in response to the I/O refresh processing being repeatedly performed in a second control period having a second length longer than the first length of the first control period;

determining whether a first frequency component comprised in the first sample value group and a second frequency component comprised in the second sample value group comprise a degree of redundancy with each other that is greater than or equal to a predetermined value; and changing the first length of the first control period to the second length of the second control period in response to the first frequency component and the second frequency component comprising the degree of redundancy with each other that is greater than or equal to the predetermined value, wherein the processor is configured to perform the series of pieces of processing comprising the input/output (I/O) refresh processing and the program execution processing in the changed first control period in response to the change in the first length of the first control period to the second length.

* * * * *